United States Patent
Sellars, Jr. et al.

(10) Patent No.: US 7,261,627 B2
(45) Date of Patent: Aug. 28, 2007

(54) MULTI-USE SEAFOOD UTENSIL

(76) Inventors: Alfred Perry Sellars, Jr., 8 Mitchell Spring Ct., Simpsonville, SC (US) 29681; Rodney Ronald Anderson, 33 Shellstone Dr., Fountain Inn, SC (US) 29644

( * ) Notice: Subject to any disclaimer, the term of this patent is extended or adjusted under 35 U.S.C. 154(b) by 92 days.

(21) Appl. No.: 11/406,871

(22) Filed: Apr. 19, 2006

(65) Prior Publication Data
US 2006/0246832 A1 Nov. 2, 2006

(51) Int. Cl.
*A22B 5/10* (2006.01)
(52) U.S. Cl. ...................................... 452/103
(58) Field of Classification Search .... 30/120.1–120.5; 452/1–6, 102–105, 12, 13, 16, 17; 81/300, 81/341, 342, 383, 418, 420, 426, 426.5
See application file for complete search history.

(56) References Cited

U.S. PATENT DOCUMENTS

| | | | | |
|---|---|---|---|---|
| 241,822 A | * | 5/1881 | Ross | 294/3 |
| 417,951 A | * | 12/1889 | Story | 30/120.4 |
| 512,818 A | * | 1/1894 | Hall | 30/120.4 |
| 1,282,278 A | * | 10/1918 | Neumann | 30/120.4 |
| 2,366,312 A | * | 1/1945 | Brintnall | 81/300 |
| 2,490,615 A | * | 12/1949 | Bloomfield | 30/120.4 |
| 3,846,908 A | * | 11/1974 | Allievi | 30/120.1 |
| 4,171,567 A | * | 10/1979 | Papalardo | 30/120.4 |
| 4,173,825 A | * | 11/1979 | Papalardo | 30/120.3 |
| 4,614,034 A | * | 9/1986 | Russell, Jr. | 30/120.3 |
| 6,052,906 A | * | 4/2000 | Weibel | 30/120.3 |

* cited by examiner

*Primary Examiner*—Thomas Price
(74) *Attorney, Agent, or Firm*—McNair Law Firm, PA; Cort Flint

(57) ABSTRACT

A multi-use seafood utensil for opening shellfish and crustacean seafood having outer shells for the removal of meat, the utensil comprising: a head portion having a prying blade for prying a seafood shell open and a bifurcated ripping blade for cutting a seafood shell open for the removal of meat; a prying tip formed on the prying blade for insertion between shell halves of a shell of a shellfish; a slot formed in the head portion dividing the ripping blade from a part of the head portion so that the ripping blade can be inserted underneath a seafood shell to cut the shell open; a cutting edge of the ripping blade forming an edge of the slot; a handle portion carried by the head portion for being manually grasped by a user.

20 Claims, 3 Drawing Sheets

MULTI-USE SEAFOOD UTENSIL

BACKGROUND OF THE INVENTION

The present invention relates to shellfish opening utensils generally, and more particularly without limitation to a novel shellfish shell cracking, slicing, and bi-valve shellfish opening knife.

Crustaceans such as shrimp, crab, and lobster are frequently cooked for eating by boiling the shellfish in the shell and then serving the cooked product while still in the shell. To enjoy the meat, the user has to remove or tear away the shell to access the meat inside. No manner of boiling or any other method of cooking the shell fish changes the characteristics of the shell to an extent that it can be easily removed from the meat. Bi-valve shellfish such as oysters, claims, and mussels, have shells with two halves that must be pried open in order to remove the meat.

The current methods of extracting the meat from shellfish, shrimp, and other crustaceans requires the use of multiple, simple tools. A basic nut cracker-type shell opening device is a simple device typically consisting of two handles joined together in different methods from single to multiple hinges. The hold and grip the shell being cracked while the user exerts pressure on the handles. Other utensils are small hammers, a blade extending from a handle, the major faces of the blade and the handle being co-axle, can opener like devices to slice open shells, and small forks for the removal of the meat once the shell has been opened.

The above methods and utensils have found world-wide acceptance for opening shellfish shells, mainly because there are very few alternative utensils. Additionally, there is the problem of cost to restaurants due to having to purchase multiple tools to accomplish the needs of their patrons. As well, the restaurants have to bear the cost of losing the tools to theft. A disadvantage to this approach is the number of utensils and different methods of use required to facilitate the removal of meat from shellfish. Additionally, many times a fork is used to open the shell of crabs, lobsters and the like, with the soft tines of the fork become distorted and damaged.

The invention, set forth in the forgoing specification and claims, combines several functions into one utensil in a unique way simplifying and expanding the enjoyment of eating various types of seafood.

SUMMARY OF THE INVENTION

The described invention includes a hand manipulated tool, utensil, or implement used to open shellfish such as oysters or claims, as well as crack the shells of lobsters, crabs, and the like, and to slice or open the shells of crab legs, lobsters, and the like.

A multi-use seafood utensil for opening shellfish for the removal of meat comprises: a head portion having a combined prying blade for prying a seafood shell open and a bifurcated ripping blade for cutting a seafood shell open for the removal of meat. The ripping blade is divided, at least in part, from the head portion so that the ripping blade can be inserted underneath a seafood shell to cut the shell open for the removal of meat. A handle portion is carried by the head portion having a first arm and a second arm to be manually grasped by a user. At least one of the arms is pivotally carried by the head portion. A shell cracking surface provided by interior opposing portions of the first and second arms of the handle portion for cracking a seafood shell when the first and second arms are grasped and squeezed together by the user. Preferably, the ripping blade includes a tine having a pointed end for insertion underneath the shell and a cutting edge for cutting the shell. A slot formed in the head portion bifurcating the ripping blade from the head portion. The tine cutting edge forms an edge of the slot. The head portion includes a first inclined edge and a second inclined edge terminating at a prying tip for insertion between shell halves of the shellfish.

In another aspect of the invention, a method of opening the shells of shellfish to remove the meat comprises: providing a seafood utensil having a head portion with an shell prying blade for prying open seafood shells with shell halves, and a ripping blade for piercing and slicing open seafood shells. A handle portion for operating the blades of the head portion is provided having a pair of handle arms between which a shell of the shellfish may be cracked. The method includes selectively utilizing the prying blade by inserting the blade between shell halves of a shellfish to pry the shell halves apart for removal of the shellfish meat, utilizing the ripping blade by inserting the blade underneath a shell of a shellfish to cut the shell open for the removal of meat, and utilizing the handle arms to crack a shell of a shellfish to open the shell for the removal of meat.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figures 1, 2:
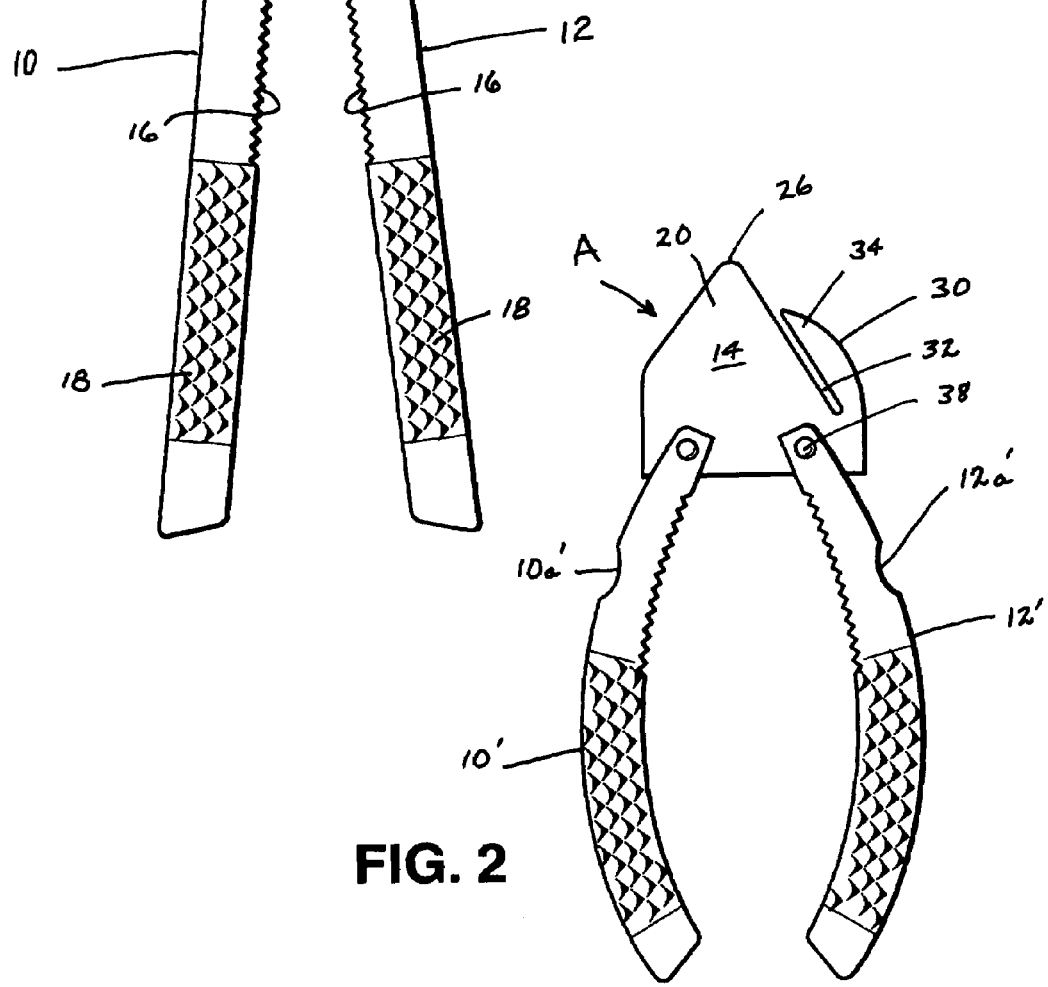
FIG. 1 is a side elevation illustrating a multi-use seafood utensil constructed according to the invention.
FIG. 2 is a side elevation illustrating a multi-use seafood utensil with an alternate handle configuration according to the invention.

Referring to FIG. 1, a multi-use seafood utensil, designated generally as A, is illustrated for facilitating the cracking and opening of crustacean shellfish such as crabs, lobsters, shrimp; and bi-valve shellfish such as oysters, clams, mussels and scallops having two shells hinged together, for the removal of meat. Utensil A includes a handle portion having two handle arms 10, 12, and a blade head portion 14. Arms 10, 12 may be pivotally connected to head portion 14, or the head portion may be integral with one of the arms with the second arm being pivotally connected to the head portion, as can best be seen in FIG. 3. A roughened or serrated portion 16 is formed on the interior of each arm 10, 12 and used to grip the seafood shell so it can be easily cracked between the arms. Head portion 14 of the utensil has a flat blade that can be used to pry open oysters, clams, mussels, and other like shellfish. The lower portions of arms 10, 12 include knurled portions 18 for the gripping of the utensil.

Figure 5:
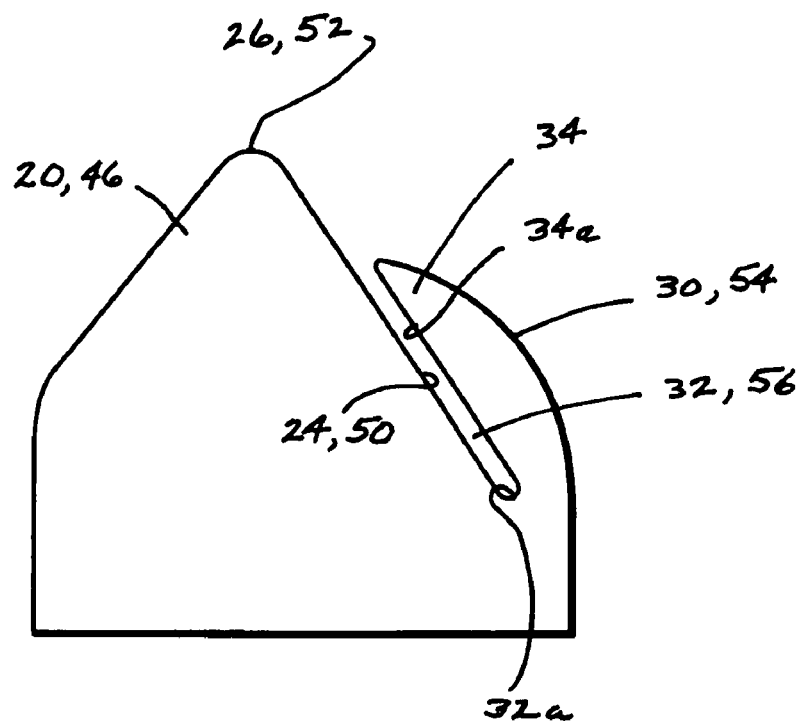
FIG. 5 is an enlarged elevation illustrating the upper blade section of a multi-use seafood utensil according to the invention.

Head portion 14 of the utensil includes a blade 20 defined by a first inclined surface 22 and a second inclined surface 24 terminating at a rounded insertion tip 26 for insertion between the shell halves of oysters, clams and the like, or used generally to cut, pry, or open the seafood. Advantageously, a bi-furcated ripping element 30 is included in the head portion defined by a slot 32 and a sharpened thumb-like tine 34 that can be inserted between the meat and the shell, and used to slice the shell open for ease in removal of the meat of crab legs, lobsters, and the like, or to devein shrimp. For this purpose, tine 34 includes a cutting edge 34a for cutting the shell or crust of the shellfish, and slot 32 has a slot end 32a (FIG. 5) which is forced against the open or broken shell when the time is between the shell and the meat.

In FIG. 2, an alternate handle arrangement is illustrated for a multi-use seafood utensil according to the invention wherein the handles 10' and 12' are bowed or curved outwardly, and include a finger indention 12a' and 10a' for the hand when griped about the handles. This provides a ergonomic form of the handles. The remainder of the utensil in FIG. 2 is like that of FIG. 1 and will not be described in detail. The same elements include the same reference numbers and descriptions. In the illustrated embodiments of FIGS. 1 and 2, the handle members 10, 12, and 10' and 12', are pivotally attached to head portion 14 by means of pivots 38.

Figure 3:
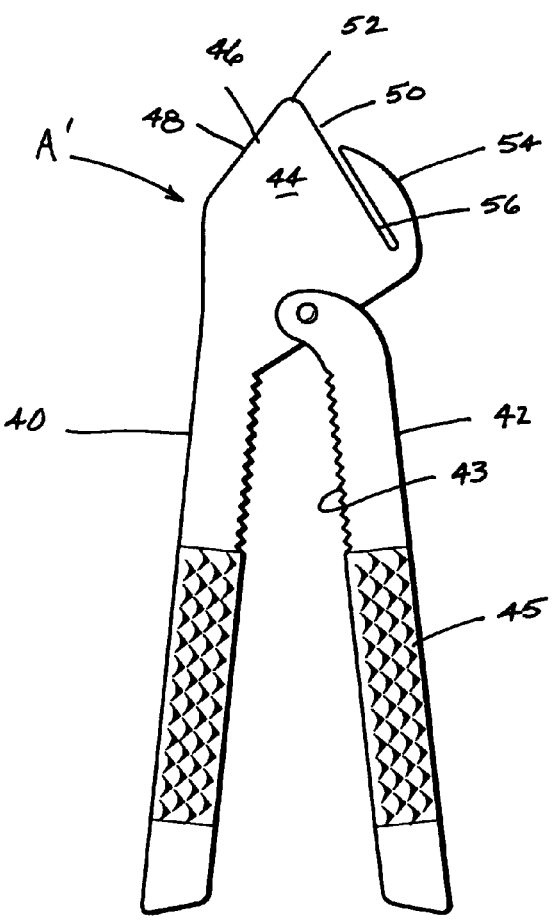
FIG. 3 is a side elevation of a multi-use seafood utensil according to another embodiment according to the invention.
Figure 4:
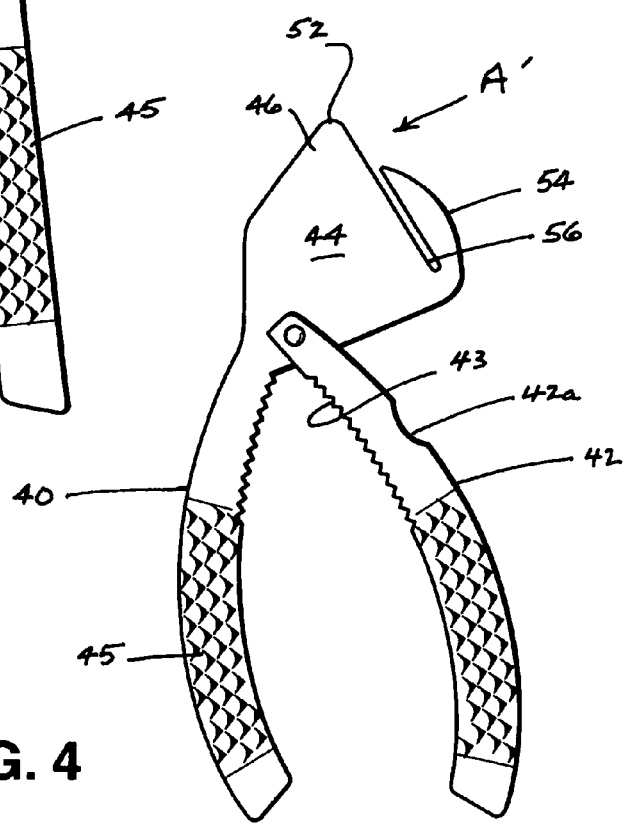
FIG. 4 is a side elevation illustrating a multi-use seafood utensil of FIG. 3 having an alternate handle configuration according to the invention.

FIGS. 3 and 4 illustrate alternate embodiments of the invention wherein only one arm is pivotally attached to the head portion while the other arm is integral with the head portion, and not pivotally attached. As illustrated, a multi-use seafood utensil, designated generally as A', is illustrated including a pair of arms 40 and 42, and a head portion 44. Head portion 44 includes a blade 46 defined by a first inclined surface 48 and a second inclined surface 50 terminating at a tip 52. Like the embodiment of FIGS. 1 and 2, the utensil includes a ripping element 54 having a slot 56 and a sharpened thumb like element tine for ripping the shell for removal of the meat. Arms 40 and 42 include serrated portions 43 for cracking the shell. Knurled portions 45 are provided for gripping. A pivot 47 attaches arm 42 to the head portion 44.

FIG. 4 illustrates an alternate embodiment of the utensil of FIG. 3 wherein arms 40' and 42' are curved or bowed outwardly to provide an ergonomic handle configuration. In this case, a finger indentation 42a is provided in handle 42 for gripping. The remainder of the description of the embodiment of FIG. 4 being the same as FIG. 3. Thus, the embodiment of FIG. 4 will not be described in detail, the reference numbering being the same.

A method of opening shells of shellfish to remove the meat comprises: providing a seafood utensil having a head portion with an shell prying blade for prying open seafood shells having shell halves and a ripping blade for piercing and slicing open seafood shells, and a handle portion for operating the blades of the head portion having a pair of handle arms between which a shell of the shellfish may be cracked. The method includes selectively; utilizing the prying blade by inserting the blade between shell halves of a shellfish to pry the shell halves apart for removal of the shellfish meat utilizing the ripping blade by inserting the blade underneath a shell of a shellfish to cut the shell open for the removal of meat, and utilizing the handle arms to crack a shell of a shellfish to open the shell for the removal of meat. The ripping blade is provided in the form of a bifurcated tine separated from a part of the head portion to define a narrow slot there between. The slot has a joint end between the tine and the head portion; and the method includes utilizing the ripping blade by forcing the tine upwardly and forwardly underneath the shell so that the shell engages the joint end of the slot whereby the shell is cut open for meat removal.

While a preferred embodiment of the invention has been described using specific terms, such description is for illustrative purposes only, and it is to be understood that changes and variations may be made without departing from the spirit or scope of the following claims.

What is claimed is:

1. A multi-use seafood utensil for opening shellfish and crustacean seafood having outer shells for the removal of meat, the utensil comprising:

a head portion having a prying blade for prying a seafood shell open and a bifurcated ripping blade for cutting a seafood shell open for the removal of meat;

the ripping blade divided at least in part from the head portion so that the ripping blade can be inserted underneath a seafood shell to cut the shell open for the removal of meat;

a handle portion carried by the head portion having a first arm and a second arm to be manually grasped by a user;

at least one of the first arm and second arm being pivotally carried by the head portion; and a shell cracking surface provided by interior opposing portions of the first and second arms of the handle portion for cracking a seafood shell when the first and second arms are grasped and squeezed together by the user.

2. The device of claim 1 wherein the ripping blade includes a tine having a pointed end for insertion underneath the shell and a cutting edge for cutting the shell.

3. The device of claim 1 wherein the shell cracking surface includes one of a roughened and serrated surface to assist in gripping the shell during cracking.

4. The device of claim 1 wherein the first and second arms include knurled portions to assist in the grasping of the arms.

5. The device of claim 1 wherein the first and second arms are curved outwardly for grasping and at least one of the arms includes a finger indentation to facilitate grasping.

6. The device of claim 5 wherein the head portion includes a first inclined edge and a second inclined edge terminating at a prying tip for insertion between shell halves of the shellfish; and the second inclined edge forms an edge of the ripping slot.

7. The device of claim 5 wherein the ripping blade includes a thumb-like tine projecting from the head portion; a tine cutting edge for cutting the shell forming an edge of the slot.

8. The device of claim 7 wherein the handle portion includes a first and second handle arm; at least one of the first arm and second arm being pivotally carried by the head portion; and a shell cracking surface provided by interior opposing portions of the first and second arms of the handle portion for cracking a seafood shell when the first and second arms are grasped and squeezed together by the user.

9. The device of claim 8 wherein the slot includes a joint end between the ripping blade and the head portion so that when the ripping blade is forced upwardly and forwardly underneath the shell the joint end of the slot engages the shell whereby the blade cuts the shell open for meat removal.

10. The device of claim 7 wherein one of the first and second arms is formed as one-piece with the head portion and the other of the first and second arms is pivotally attached to the head portion.

11. The device of claim 10 wherein the ripping blade is provided in the form of a bifurcated tine separated from a part of the head portion to define a narrow slot there between, the slot having a joint end between the tine and the head portion; and the method includes utilizing the ripping blade by forcing the tine upwardly and forwardly underneath the shell so that the shell engages the joint end of the slot whereby the shell is cut open for meat removal.

12. The device of claim 7 wherein the head portion includes a first inclined edge and a second inclined edge terminating at the prying tip; and the second inclined edge forms an edge of the ripping slot.

13. The device of claim 1 wherein each of the first and second arms are pivotally attached to the head portion.

14. The device of claim 1 wherein one of the first and second arms is formed as one-piece with the head portion and the other of the first and second arms is pivotally attached to the head portion.

15. The device of claim 14 wherein the slot includes a joint end between the ripping blade and the head portion so that when the ripping blade is forced upwardly and forwardly underneath the shell the joint end of the slot engages the shell whereby the blade cuts the shell open for meat removal.

16. The device of claim 15 wherein each of the first and second arms are pivotally attached to the head portion.

17. The device of claim 1 including a slot formed in the head portion bifurcating the ripping blade and the head portion.

18. The device of claim 1 wherein the head portion includes a first inclined edge and a second inclined edge terminating at a prying tip for insertion between shell halves of the shellfish.

19. A multi-use seafood utensil for opening shellfish and crustacean seafood having outer shells for the removal of meat, the utensil comprising:
 a head portion having a prying blade for prying a seafood shell open and a bifurcated ripping blade for cutting a seafood shell open for the removal of meat;
 a prying tip formed on the prying blade for insertion between shell halves of a shell of a shellfish;
 a slot formed in the head portion dividing the ripping blade from a part of the head portion so that the ripping blade can be inserted underneath a seafood shell to cut the shell open;
 a cutting edge of the ripping blade forming an edge of the slot;
 a handle portion carried by the head portion for being manually grasped by a user.

20. A method of opening soft and hard shells of shellfish to remove the meat comprising:
 providing a seafood utensil having a head portion with an shell prying blade for prying open seafood shells having shell halves and a ripping blade for piercing and slicing open seafood shells, and a handle portion for operating the blades of the head portion having a pair of handle arms between which a shell of the shellfish may be cracked, wherein the method includes selectively;
 utilizing the prying blade by inserting the blade between shell halves of a shellfish to pry the shell halves apart for removal of the shellfish meat;
 utilizing the ripping blade by inserting the blade underneath a shell of a shellfish to cut the shell open for the removal of meat; and
 utilizing the handle arms to crack a shell of a shellfish to open the shell for the removal of meat.

* * * * *